UNITED STATES PATENT OFFICE.

CARL OELSCHLAEGEL, OF BERLIN, GERMANY, ASSIGNOR TO THE ACTIEN-GESELLSCHAFT FÜR ANILIN FABRIKATION, OF SAME PLACE.

BLUE-BLACK WOOL-DYE AND PROCESS OF MAKING SAME.

SPECIFICATION forming part of Letters Patent No. 628,025, dated July 4, 1899.

Application filed April 8, 1899. Serial No. 712,305. (Specimens.)

*To all whom it may concern:*

Be it known that I, CARL OELSCHLAEGEL, of Berlin, in the Kingdom of Prussia, German Empire, have invented new and useful Improvements in the Production of Bluish-Black Wool-Dyes; and I do hereby declare that the following is a full, clear, and exact description of the invention, which will enable others skilled in the art to which it appertains to make and use the same.

My invention relates to the production of a new black disazo dyestuff for wool by means of a new sulfo-acid—namely, the sulfo-acid of para-amidophenyl-beta-naphthylamin, which possesses the following constitution:

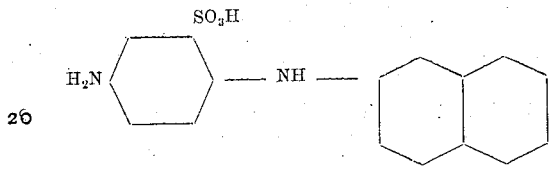

I have discovered that this acid may be used as first component in the production of disazo dyes by combining its diazo compound with one molecular proportion of alpha-naphthylamin, diazotizing again the resulting amidoazo compound and combining the rediazotized product with beta$_1$-naphthol-beta$_3$-sulfo-acid. The disazo dye obtained in this way has been found to be a most valuable product for dyeing wool, producing on wool in an acidified bath bluish-black shades of remarkable intensity and, moreover, fast to light and to milling.

The para-amidophenyl-beta-naphthylaminsulfo acid used as starting product and which up to the present has not yet been described is prepared in the following manner: The sodium salt of para-nitrochlorbenzene-ortho-sulfo acid is dissolved in about ten times its weight of water and heated in a closed vessel to about 160° to 170° centigrade for twelve hours, together with an equimolecular quantity of beta-naphthylamin and a suitable agent for the absorption of the hydrochloric acid formed during the reaction, such as sodium carbonate, calcium carbonate, &c. The reaction product obtained is directly reduced after addition of hydrochloric acid by means of iron, zinc, or the like. After the reduction the mass is rendered alkaline with carbonate of soda and filtered from the iron residues. On addition of common salt to the solution obtained the sodium salt of para-amidophenyl-beta-naphthylaminsulfo acid separates in crystalline form. It forms in dry state a grayish powder, readily soluble in hot water, moderately soluble in cold water, and soluble in alcohol. On the addition of a mineral acid to the aqueous solution of this salt the free para-amidophenyl-beta-naphthylamin sulfo acid is precipitated.

For practically carrying out my invention I may proceed, for instance, as follows: 33.6 kilos of the sodium salt of para-amidophenyl-beta-naphthylaminsulfo acid are diazotized by means of seven kilos of sodium nitrite and of thirty kilos hydrochloric acid, (22° Baumé.) The yellowish solution of the diazo compound obtained, from which a portion of the latter is separated in form of a yellow crystalline precipitate, is allowed to flow into an aqueous solution of eighteen kilos of alpha-naphthylamin hydrochlorid. To the mixture thirty-five kilos of sodium acetate are added, and the whole is stirred until the combination is completed. The amidoazo compound formed in this way represents a blue-black precipitate, which after addition of a small quantity of hydrochloric acid is filtered off and washed with cold water. The amidoazo compound is then dissolved in water on addition of the necessary quantity of caustic-soda lye. To this solution seven kilos of sodium nitrite dissolved in water and thirty kilos of hydrochloric acid (22° Baumé) are added. The diazoazo compound formed in this way is a blue-back precipitate. It is introduced into a solution of twenty-five kilos of the sodium salt of beta$_1$-naphthol-beta$_3$-monosulfo acid, which solution is kept alkaline by means of sodium carbonate. The mixture is well stirred during twenty hours. After gently heating, the dyestuff is isolated by addition of common salt, filtered off, pressed, and dried.

The dyestuff forms in dry state a brown-black powder which dissolves readily in water with blue color. On addition of caustic-soda lye to this solution a bluish-black precipitation is formed. From the aqueous solution of the dye the free color-acid is precipitated on addition of mineral acids in the shape of blue-black flakes. The coloring-matter is almost entirely insoluble in alcohol. It dissolves in concentrated sulfuric acid with violet-black color, which by addition of ice-water turns at first to red-violet, while on further diluting a black precipitate is formed. The new coloring-matter dyes wool in an acidified bath bluish-black and fast shades of great intensity.

The following alteration may be made in the above example without materially changing the character of the product obtained. Instead of $beta_1$-naphthol-$beta_3$-sulfonic acid I may use $beta_1$-naphthol-$beta_4$-sulfonic acid or $alpha_1$-naphthol-$alpha_2$-sulfonic acid.

Having now described my invention, what I claim is—

1. The process for the production of new disazo-dyestuff which consists in diazotizing the para-amidophenyl-beta-naphthylaminsulfo-acid having the formula:

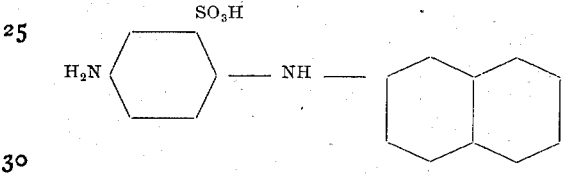

combining the diazo compound produced with one molecular proportion of alpha-naphthylamin, rediazotizing the amidoazo compound thus obtained and combining the diazoazo compound with a naphtholmonosulfo-acid, substantially as herein described.

2. The hereinbefore-described dye prepared by combining the diazo compound of para-amidophenyl-beta-naphthylamin-sulfo acid with alpha-naphthylamin, diazotizing again the intermediate product thus obtained and combining it with $beta_1$-naphthol-$beta_3$-monosulfonic acid, which dye possesses in the form of its sodium salt the formula:

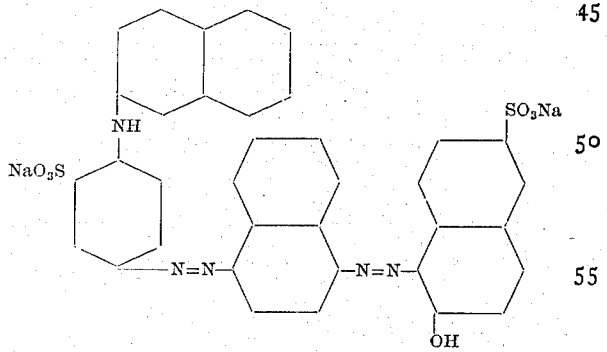

and forms when dry and pulverized a brownish-black powder, readily soluble in water, giving a blue solution in which caustic-soda-lye produces a bluish-black precipitate; the aqueous solution of the dye yielding on addition of mineral acids a precipitation of the free color-acid in the shape of blue-black flakes; the dye being almost entirely insoluble in alcohol, dissolving in concentrated sulfuric acid with violet-black color which by addition of ice-water turns at first to red-violet while on further diluting a black precipitate is formed; said dye producing on wool in an acidified bath bluish-black shades.

In witness whereof I have hereunto signed my name, this 23d day of March, 1899, in the presence of two subscribing witnesses.

CARL OELSCHLAEGEL.

Witnesses:
WOLDEMER HAUPT,
HENRY HASPER.